Sept. 9, 1952      W. C. RIDDELL ET AL      2,610,130
WATER-REPELLENT GYPSUM PRODUCT
Filed July 10, 1950
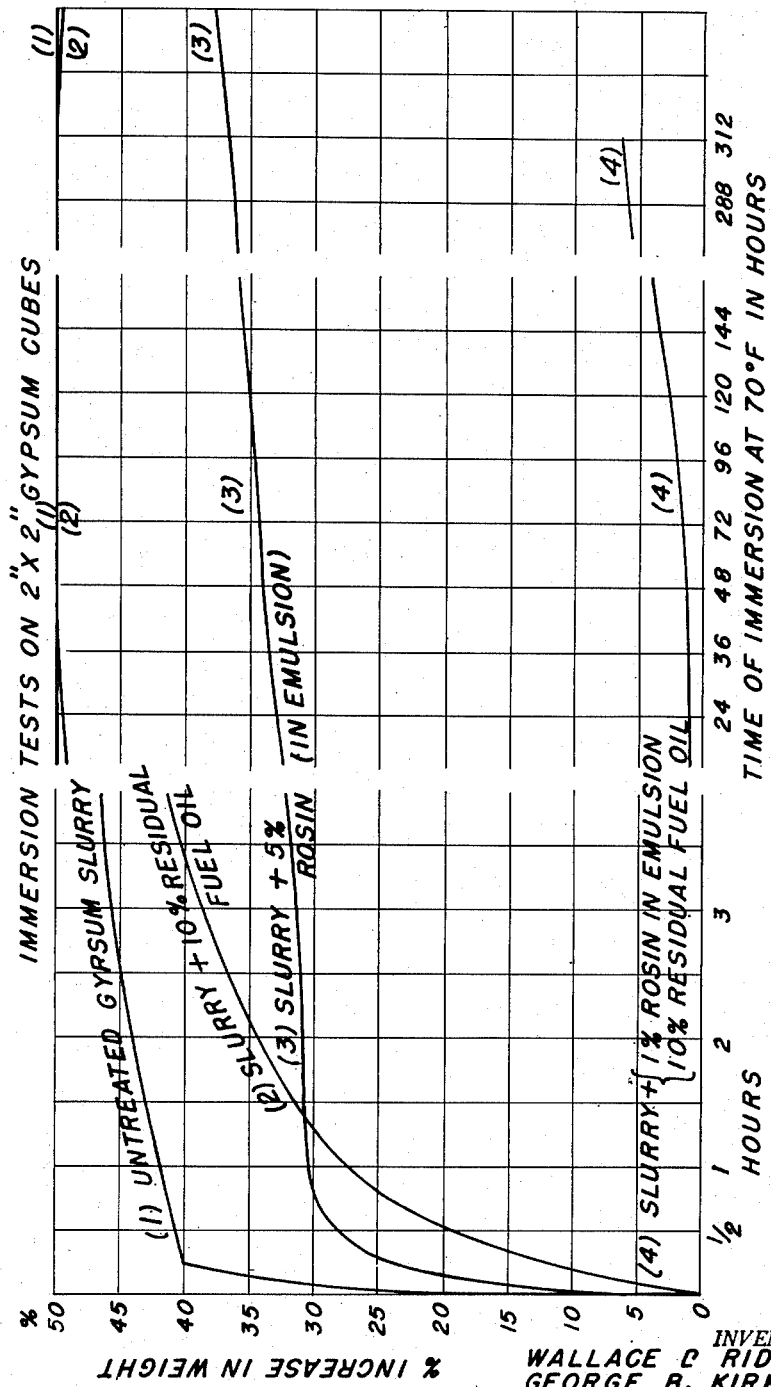
INVENTORS
WALLACE C. RIDDELL
GEORGE B. KIRK
BY James E. Toomey Patented Sept. 9, 1952

2,610,130

UNITED STATES PATENT OFFICE 2,610,130

WATER-REPELLENT GYPSUM PRODUCT

Wallace C. Riddell, Berkeley, and George B. Kirk, Redwood City, Calif., assignors, by mesne assignments, to Kaiser Gypsum Company, Oakland, Calif., a corporation of California Application July 10, 1950, Serial No. 172,868

16 Claims. (Cl. 106—116)

1

This invention relates to the preparation of water-resistant, or water-repellent, cementitious products; and, especially, it relates to the production of water-resistant gypsum compositions, such as gypsum wallboard, gypsum tile and other gypsum products.

Earlier workers in this field have developed or proposed many methods for increasing the water-resistance or water-repellency of gypsum products, especially wallboard, which, for example, would enable use of the latter as sheathing material in the construction industry. Included in such methods have been processes wherein materials imparting water-resistance or water-repellency were incorporated in the gypsum slurry during the process of manufacture, as well as coating of the finished product with a waterproofing material. The disadvantage of the latter method is that any break in the surface will permit water penetration and absorption. The incorporation of water-repellency agents within the slurry is an advance in this art, but the processes heretofore employed have been rather expensive and, especially, have required expensive additives, and have sometimes necessitated either melting the agent or drying the treated slurry at an elevated temperature in order to effect proper diffusion of the treating agent and effective protection of the gypsum.

According to the present invention it has now been found that the above disadvantages are overcome and a water-resistant or water-repellent gypsum product is obtained by a process wherein there is incorporated in the calcined gypsum residual fuel oil and rosin in the form of a dispersion in water. At least about 0.5% of rosin is added, calculated on the dry basis. Advantageously, up to about 2.0% of rosin, on the dry basis, is added; and it is preferred to add from about 0.5% to about 1.0% thereof. From about 2.0% to about 10.0% of the oil is added, and preferably from about 5.0% to about 10% thereof, calculated on the dry basis. These percentages, as indicated, are calculated on the dry weight of the total unset gypsum composition; and the percentage of rosin relates to the dry substance. Higher amounts than shown can be added without detriment, but excellent water-repellency is obtained within these ranges and increased amounts result in increased costs.

The term "residual fuel oil" as employed in this specification and claims means the heavier residual liquid fraction of petroleum, such as Bunker C oil, heavy fuel oil and equivalent heavy petroleum fractions; but it excludes the lighter fractions including gasoline, kerosene and diesel oils, on the one hand, and the solid residues of processing, including waxes and asphalt, on the other hand. One sort of residual fuel oil employed herein is a petroleum fraction which has a specific gravity of from 7.4 to 8.8, A. P. I. at 60° F.; and a flash point (closed cup) of from 205° F. to 212° F. It contains, upon analysis, approximately 85% carbon and 10% hydrogen, the remainder being water, sulfur, nitrogen, ash, etc. However, other equivalent heavy petroleum oils can be employed.

The rosin, or colophony, employed in this invention is the solid residue recovered in the processing of pine wood, or of the wound exudations from pine trees, by methods well-known to the art, including the steam and solvent extraction of pine wood, and the distillation of the gum exudate, whereby turpentine is recovered in one fraction and rosin in the other fraction, or residue. Rosin consists largely of abietic acid, and has a melting point of from 120° C. to 150° C. depending upon the source and method of manufacture. The rosin employed can be light or dark in color. When made into an emulsion with water, the rosin becomes very highly subdivided and is present in such emulsion in particles having an average diameter of not more than about 1.5 microns, and probably of not over about one micron. Water emulsions of rosin which are available commercially contain from 40% to 50%, or up to 60% rosin, but emulsions containing other amounts of rosin are useful herein.

Water dispersions of rosin, preferably emulsions, can be prepared as desired, in any convenient manner; and such emulsions are available commercially. Advantageously such an emulsion contains a small amount, up to about 3.5%, of a stabilizer or emulsifying agent, for example a protein, such as casein, or sulfonated oil, sulfonated or sulfated alcohol and carboxylic acid, starch, clay, gum, or other desired agent. Varying amounts of rosin can be present in the emulsion but it is economically desirable to employ emulsions containing higher amounts of rosin.

The rosin and residual fuel oil can be admixed with the gypsum mass in various ways. The gypsum and the oil can, if desired, be admixed and the mixture then subjected to calcination to dehydrate the gypsum and form the desired calcium sulfate hemihydrate, for example, by heating to about 170° C. (340° F.). Alternatively the oil can be mixed with the dry calcined gypsum by grinding these components together, or by mixing in a screw conveyor or other suitable mixing device; or the oil can be mixed with the slurry of calcined gypsum. The rosin dispersion can be mixed with the dry calcined gypsum, or with the slurry of calcined gypsum, by any suitable means. The rosin dispersion can alternatively be mixed with the water to be employed in making up the gypsum slurry, and this liquid then mixed with the calcined gypsum. In still another method, the rosin dispersion and oil can be first mixed together and this mixture added to the water for slurrying, or to the calcined gypsum slurry, and the whole intimately mixed. The admixture is suitably formed into shape, for example, by casting, and dried. Drying can be carried out at atmospheric or at elevated temperatures.

It is a particular advantage of the present invention that the additives employed are in liquid form, are readily blended into the mix, and do not require comminution or fusion. The liquid materials are easily handled or poured. The oil employed does not volatilize off in the drier, which would require either recovery of the volatilized material or proper disposal of the fumes or gases. It is also an advantage that the rosin dispersion is in such form that it disperses rapidly and thoroughly in the aqueous gypsum slurry. It is a further advantage of the process that the water-repellency additives are effective without the necessity for drying the gypsum products at higher temperatures. This enables production of water-repellent blocks of gypsum, or of structural elements, such as roofs or floors, which are cast and dried at the site of use under circumstances where the employment of elevated drying temperatures is not economicallly feasible.

The attached drawing demonstrates the advantageous results obtained by the present invention, and in this figure are shown graphically the changes in water-absorption with respect to time of immersion in water, for test samples of gypsum. These values were obtained by tests carried out in the following manner. (1) A portion of calcined gypsum, with no added agents, is made into a plastic slurry with water, cast into cubes 2 inches on an edge (8 cubic inches in volume) and dried at 125° F. (2) Another portion of the calcined gypsum is mixed with 10% by weight of residual fuel oil and the whole made into a plastic slurry, which is cast and dried as in (1). (3) Another portion of the calcined gypsum is made into a plastic slurry in water containing 5% by weight, dry basis, of rosin in water emulsion, cast and dried as in (1). (4) Another portion of the calcined gypsum is mixed with 10% residual fuel oil and the mixture made into a plastic slurry with water containing 1% by weight, dry basis, of rosin in water emulsion, and the resulting mixture cast and dried as in (1). The cubes obtained are tested for water absorption by immersing in water of such depth that a one-inch head is maintained above the pieces, at a temperature of 70° F., for periods of time as shown on the figure. The rosin emulsion employed in these tests contains 45% solids, and the softening point (ring and ball method) of the dried residue remaining after evaporation to dryness and comprising rosin and emulsifying agent is 223° F. At the end of the respective periods of immersion, test cubes are examined to determine the amount of water absorbed, and these values, up to 312 hours, are plotted to give the curves shown in the figure. As there demonstrated, the untreated gypsum (1) absorbs water very rapidly. The portion treated with oil alone (2) and that treated with rosin emulsion alone (3), even in a relatively large amount, also absorb water quite rapidly, although somewhat less so than the untreated material. When both the oil and the rosin emulsion are employed (4), the decrease in water absorption is quite pronounced and satisfactory, and is more than would be expected from results of treatment with either oil or rosin emulsion alone.

The examples given below will more clearly illustrate the mode of carrying out the invention:

Example I

A plastic gypsum slurry containing 1000 grams of calcined gypsum is mixed with 20 grams of a water emulsion of rosin containing 50% solids, corresponding to 1.0% rosin, dry basis, and 50 grams of residual fuel oil, and the mixture cast into cubes 2 inches on an edge. The cubes are dried at room temperature (about 60° to 70° F.) and are then tested for water-repellency by the immersion test described above. After 48 hours immersion the cubes exhibit 2.6% average increase in weight.

Example II

To a plastic slurry of calcined gypsum are added, on the dry basis, 1.0% of rosin in water emulsion and 10% of residual fuel oil. The whole is well mixed and is then formed into gypsum boards on a conventional wallboard machine whereby gypsum core material is disposed within fibrous liners; and the boards are dried at room temperature (60° to 70° F.). The half-inch board is cut into 6" x 6" sections and subjected to the immersion test above described. The following results are obtained:

| Time of Immersion | Percent Increase in Weight |
| --- | --- |
| 30 minutes | 2.3 |
| 1 hour | 2.6 |
| 2 hours | 3.1 |
| 3 hours | 4.6 |
| 6 hours | 5.0 |

Gypsum board made without addition of a waterproofing or water-repellency agent, and similarly tested shows a water-absorption, or increase in weight, of 48% after 5 hours immersion.

In the examples and tests given herein, water absorption is determined by ascertaining the increase in weight after immersion in water. The oil employed in these examples is a petroleum fraction known as Bunker C oil; and it has a specific gravity of from 7.4 to 8.8 A. P. I. and flash point (closed cup) of from 205° F. to 212° F. Other heavy liquid petroleum fractions can be employed.

In a variation, a minor portion of the rosin can be substituted for, or replaced by, a petroleum wax, preferably microcrystalline wax in the form of a water emulsion. The employment of such wax in gypsum compositions is described and claimed in our co-pending application, Ser. No. 172,867, filed July 10, 1950. The solid water-repellency agent containing rosin and wax is admixed with the gypsum material in the same manner as described hereinabove. The wax and rosin can be added each as a water emulsion, or together in the form of a single water emulsion.

In preparing water-repellent gypsum products according to this invention it is believed that the rosin is effective because of the very small particle size thereof obtained by dispersing the rosin in water. Preferably, rosin is emulsified with water and is added in this state. In such emulsion the particle size of the rosin is frequently not over about 1.5 microns diameter, and the average particle size is usually about 1.0 micron diameter. Therefore when adding 0.5% rosin in a gypsum board, for instance, there is added about 7 pounds of rosin which, calculated on the basis of one micron diameter average particle size and as having a specific gravity of approximately 1, provides approximately 33,000 square feet covering capacity. This dispersion in the board or other gypsum product does not require fusion or melting in the process of manufacture.

The rosin is added in the form of a dispersion in water, and the term "dispersion" is intended to include both an emulsion, or a colloidal dispersion, and a suspension of finely divided rosin. For instance, when an emulsion of rosin in water "breaks," it frequently forms a thick paste which can be employed with thorough stirring but without necessity for re-dispersion in a larger amount of water prior to admixture with the gypsum slurry. The rosin is finely divided in either embodiment.

In this specification and claims, percentages shown are by weight, unless otherwise indicated. In general, it is advantageous to employ higher percentages of the oil or tar described when the lower amounts of a rosin, within the preferred range for the rosin, is employed. While the employment of higher drying temperatures is advantageous for the purpose of accelerating the drying of the gypsum products, such temperatures are not required in order to obtain the water-repellent effect of the compounds employed herein; and where speed of drying is not desired, or is not practicable, drying at air or room temperature is useful. It is to be understood that the usual modifying additives can be, and are, admixed in the calcined gypsum slurries where desired, as in making wallboard, for example.

The above examples and specific description have been given for purposes of illustration only and it is to be understood that modifications and variations can be made therein without departing from the spirit and scope of the appended claims. Having now described the invention what is claimed is:

1. Water-repellent gypsum product comprising a set mass of gypsum crystals protectively coated with from 0.5% to 2.0% by weight of uniformly dispersed finely divided rosin, and from 2% to 10% by weight residual fuel oil.

2. Water-repellent gypsum product comprising a set mass of gypsum crystals protectively coated with from 0.5% to 1.0% by weight of uniformly dispersed finely divided rosin, and from 5% to 10% by weight of residual fuel oil.

3. Water-repellent gypsum wallboard comprising a gypsum core disposed within fibrous liners wherein said core comprises a set mass of gypsum crystals protectively coated with from 0.5% to 2.0% by weight of uniformly dispersed finely divided rosin having an average particle size of about one micron diameter, and from 5% to 10% by weight of residual fuel oil.

4. Product as in claim 3 wherein said crystals are coated with 0.5% to 1.0% of said rosin.

5. Process for preparing a water-repellent gypsum product which comprises intimately admixing a water slurry of calcined gypsum, from 0.5% to 2.0% by weight, calculated on the dry basis, of rosin in the form of a dispersion in water, and from 2% to 10% by weight, on the dry basis, of residual fuel oil, forming into shape, and drying.

6. Process for preparing a water-repellent gypsum product which comprises intimately admixing a water slurry of calcined gypsum, from 0.5% to 2.0% by weight, calculated on the dry basis, of rosin in the form of a water emulsion, and from 5% to 10%, by weight, on the dry basis, of residual fuel oil, forming into shape, and drying.

7. Process for preparing a water-repellent gypsum product which comprises intimately admixing a water slurry of calcined gypsum, from 0.5% to 2.0% by weight, calculated on the dry basis, of rosin in the form of a water emulsion wherein said rosin is dispersed in particles of average size of not over about 1 micron diameter, and from 2% to 10% by weight, on the dry basis, of residual fuel oil, forming into shape, and drying.

8. Process as in claim 7 wherein drying is carried out at atmospheric temperature.

9. Process as in claim 7 wherein there is admixed from 0.5% to 1.0% of said rosin.

10. Process for preparing a water-repellent gypsum product which comprises intimately admixing a water slurry of calcined gypsum, from 0.5% to 2.0% by weight, calculated on the dry basis, of rosin in the form of a water emulsion wherein said rosin is dispersed in particles of average size not over about 1 micron diameter, and from 5% to 10% by weight, on the dry basis, of residual fuel oil, forming into shape, and drying.

11. Process as in claim 10 wherein drying is carried out at atmospheric temperature.

12. Process as in claim 10 wherein there is admixed from 0.5% to 1.0% of said rosin.

13. Process of making a water-repellent gypsum product comprising admixing gypsum and from 5% to 10%, calculated on the dry weight of the total composition, of residual fuel oil, calcining to dehydrate said gypsum and form calcium sulfate hemihydrate, forming a water slurry of said calcined product, intimately admixing therewith from 0.5% to 2.0% by weight, on the dry basis, of rosin in the form of a water emulsion, forming into shapes, and drying.

14. Process of making a water-repellent gypsum board which comprises intimately admixing a water slurry of calcined gypsum, from 0.5% to 2.0% by weight, calculated on the dry basis, of rosin in the form of a water emulsion wherein said rosin is dispersed in particles having an average size of not over about one micron diameter, and from 5% to 10% by weight, on the dry basis, of residual fuel oil, casting said admixture into shape as boards, and drying said boards.

15. Process as in claim 14 wherein said boards are dried at room temperature.

16. Process as in claim 14 wherein from 0.5% to 1.0% of said rosin is admixed.

WALLACE C. RIDDELL.
GEORGE B. KIRK.

REFERENCES CITED

The following references are of record in the file of this patent:

UNITED STATES PATENTS

| Number | Name | Date |
|---|---|---|
| 1,287,453 | Sanderson | Dec. 10, 1918 |
| 1,923,383 | Lundteigen | Aug. 22, 1933 |
| 2,198,776 | King et al. | Apr. 30, 1940 |
| 2,432,963 | Camp | Dec. 16, 1947 |
| 2,483,806 | Buckley et al. | Oct. 4, 1949 |
| 2,526,538 | Camp | Oct. 17, 1950 |